United States Patent
Manigatter et al.

(10) Patent No.: US 9,364,984 B2
(45) Date of Patent: Jun. 14, 2016

(54) METHOD AND APPARATUS FOR PRODUCING SEVERAL INJECTION-MOLDED PARTS

(71) Applicants: Kurt Manigatter, Alkoven (AT); Karl Adlesgruber, Allhaming (AT); Paul Fattinger, Heiligenberg (AT); Christian Reslhuber, Niederneukirchen (AT)

(72) Inventors: Kurt Manigatter, Alkoven (AT); Karl Adlesgruber, Allhaming (AT); Paul Fattinger, Heiligenberg (AT); Christian Reslhuber, Niederneukirchen (AT)

(73) Assignee: ELAST KUNSTSTOFFVERARBEITUNGS-GMBH & CO. KEG, Heiligenberg (AT)

( * ) Notice: Subject to any disclaimer, the term of this patent is extended or adjusted under 35 U.S.C. 154(b) by 577 days.

(21) Appl. No.: 13/726,046

(22) Filed: Dec. 22, 2012

(65) Prior Publication Data
US 2013/0161870 A1   Jun. 27, 2013

(30) Foreign Application Priority Data

Dec. 22, 2011   (AT) .............. A 50018/2011

(51) Int. Cl.
| | |
|---|---|
| *B29C 45/32* | (2006.01) |
| *B29C 45/26* | (2006.01) |
| *B29C 45/27* | (2006.01) |
| B29C 45/00 | (2006.01) |

(52) U.S. Cl.
CPC .............. *B29C 45/322* (2013.01); *B29C 45/26* (2013.01); *B29C 45/2669* (2013.01); *B29C 45/2756* (2013.01); *B29C 45/0081* (2013.01); *B29C 2045/0089* (2013.01)

(58) Field of Classification Search
CPC .............. B29C 45/322; B29C 45/2669; B29C 2045/2691; B29C 45/0089; B29C 45/2683
See application file for complete search history.

(56) References Cited

U.S. PATENT DOCUMENTS

| | | | | | |
|---|---|---|---|---|---|
| 2,570,433 | A | * | 10/1951 | Dodge | ............ 425/561 |
| 2,883,704 | A | | 4/1959 | Jurgeleit | |
| 3,070,843 | A | | 1/1963 | Jurgeleit | |
| 3,121,918 | A | | 2/1964 | Jurgeleit | |
| 4,091,057 | A | * | 5/1978 | Weber | ............ 264/2.2 |
| 5,792,406 | A | * | 8/1998 | Wada et al. | ............ 264/157 |

FOREIGN PATENT DOCUMENTS

| | | |
|---|---|---|
| DE | 909152 | 4/1954 |
| DE | 31 07 865 A | 12/1981 |
| EP | 68 615 B | 1/1983 |
| EP | 1 477 292 | 11/2004 |
| GB | 806062 | 12/1958 |
| JP | 7-314499 | 12/1995 |

* cited by examiner

*Primary Examiner* — Benjamin Schiffman
(74) *Attorney, Agent, or Firm* — Jordan IP Law LLC; Todd A. Vaughn

(57) ABSTRACT

A method for simultaneously producing several injection-molded parts. A mold is provided comprising a plurality of molding plates fluidically connected to each other and which combine form a plurality of mold cavities defining the contour of a finished injection-molded product. A material such as a plastic material is injected via an injection nozzle into one of the mold cavities such that the material flows successively through the mold cavities from one mold cavity to an adjacent mold cavity.

19 Claims, 5 Drawing Sheets

METHOD AND APPARATUS FOR PRODUCING SEVERAL INJECTION-MOLDED PARTS

CROSS-REFERENCE TO RELATED APPLICATIONS

The present application claims priority under 35 U.S.C. §119 to Austrian Patent Application No. A 50018/2011 (filed on Dec. 22, 2011), which is hereby incorporated by reference in its entirety.

FIELD OF THE INVENTION

Embodiments of the invention relate to a method for producing several injection-molded parts made of fluid plastics which solidify at higher temperatures, or of vulcanizing elastomeric materials such as silicones or India rubber. In particular, embodiments of the invention relate to an injection-molding method for thermosetting plastics in which several injection-molded parts can be produced in one single step via an injection nozzle.

Thermosetting materials within the terms of the invention are substantially fluid plastics which solidify at higher temperatures, or vulcanizing elastomeric materials such as silicones or India rubber. Such a fluid plastics are injected during processing at low temperature via an injection nozzle into a mold cavity and vulcanize there under heat action into the desired injection-molded part.

BACKGROUND OF THE INVENTION

It is known to produce injection-molded parts in such a way that after treatment is required in the region of the sprue position of the injection-molded parts and/or the dividing plane of the die halves. Respective methods and associated apparatuses are described among other things in U.S. Pat. No. 2,883,704, U.S. Pat. No. 3,070,843 and Japanese Patent Publication No. JP OS 48-72258.

Furthermore, molding apparatuses are known for producing sprue-free molded parts as a consequence of precise surface contact of a pair of mold parts which form a mold cavity. A molding apparatus is known from U.S. Pat. No. 3,121,918, in which a chamber is arranged on an upper surface of the bottom heating plate. An upper surface of the chamber is covered by membrane. A heat-proof fluid is filled into the chamber and held under pressure. The membrane will be deflected by the pressurized fluid and will therefore maintain very tight contact between the adjacent molds. One or several cavities can be provided in this case in the molding apparatus for producing sprue-free parts. In accordance with the teachings of this specification, the production of sprue-free parts is not possible when many cavities are provided in the molding apparatus.

In order to remedy this problem, German Patent Publication No. DE 31 07 865 A describes a molding apparatus for producing a plurality of plastic parts which are formed in a sprue-free or fin-free manner and in which the thermosetting material emerging from the injection nozzle is divided among several adjacently arranged mold cavities. The molding apparatus comprises an upper holding element for fixing at least one upper mold with a channel in which a moldable material is introduced and a bottom holding element for fixing at least one bottom mold with a cavity, with a specific quantity of a fluid being filled between a bottom surface of the bottom mold and the bottom holding element. As a result, the bottom mold floats on the fluid and is movable along the bottom holding element. After producing a surface contact between the bottom surface of the upper mold and the upper surface of the bottom mold, precise mutual contact is obtained as a result of the backpressure of the fluid. A plurality of sprue-free parts in adjacently arranged mold cavities can be injection-molded simultaneously in this manner.

It is disadvantageous in all these apparatuses, however, that all mold cavities need to be arranged adjacent to one another.

A mold with successively arranged mold cavities is known from European Patent Publication No. EP 68 615 B, with the mold cavities being separated from one another after the closing of the mold. The injection, therefore, needs to be performed during a partly open mold. Fins can therefore not be prevented. In particular, complex measures need to be provided for removing the excess material.

Japanese Patent Publication No. JP 7-314499 A shows a mold in which the mold cavity is outwardly opened in order to ensure secure filling of the mold cavity without the risk of the escape of excess material.

SUMMARY OF THE INVENTION

Embodiments of the invention, therefore, provide a die for the simultaneous, sprue-free production of a plurality of thermosetting injection-molded parts, in which several successively arranged mold cavities are filled by an injection nozzle continuously with the thermosetting plastic.

In accordance with embodiments, a method for producing several injection-molded parts made of fluid plastics which solidify at higher temperatures, or of vulcanizing elastomeric materials such as silicones or India rubber, can include at least one of the following steps: closing a mold comprising at least two corresponding molding plates which form several mold cavities defining the contour of the finished products and one lost cavity; injecting a plastic via at least one injection nozzle in form of a cold runner nozzle or a comparable injection nozzle into a mold cavity; pressing the plastic successively through nozzle-like transfer passages between the mold cavities from one to the next one, and being pressed from a last mold cavity via a further transfer passage into the lost cavity, wherein the lost cavity accommodates the excess plastic and the air present before the injection into the mold cavities.

In accordance with embodiments, a method for simultaneously producing several injection-molded parts is provided, the method including at least one of the following: closing a mold comprising at least two corresponding molding plates which form several mold cavities defining the contour of the finished products and a lost cavity; and then injecting a material via at least one injection nozzle comprising a cold runner nozzle into a mold cavity such that the material flows successively through nozzle-like transfer passages between the mold cavities from one mold cavity to an adjacent mold cavity and then terminating into the lost cavity which is configured to accommodate excess material and air.

In accordance with embodiments, a method for simultaneously producing several injection-molded parts is provided, the method including at least one of the following: providing a mold comprising a plurality of molding plates fluidically connected to each other and which combine to form a plurality of mold cavities defining the contour of a finished injection-molded product; and then injecting a material via an injection nozzle into one of the mold cavities such that the material flows successively through the mold cavities from one mold cavity to an adjacent mold cavity.

In accordance with embodiments, an apparatus for producing several injection-molded parts is provided, the apparatus including at least one of the following: a mold that includes at least two corresponding molding plates which can be moved between an opened position and a closed position and which form several mold cavities; at least one injection nozzle configured to introduce a material into a mold cavity; a plurality of first transfer passages configured to fluidically connect the mold cavities to each when the molding plates are in the closed position; and a lost cavity configured for fluidic connection to a last mold cavity via a second transfer passage.

A relevant aspect of embodiments of the invention is that the flow of the plastic occurs successively through the individual mold cavities, with the injected plastic having a very low viscosity as a result of its relatively low temperatures.

It is also relevant that the transfer passages between the individual mold cavities have a relatively small cross section because the magnitude of the cross section is that of the injection nozzle. The entire air present in the mold cavities before the injection is pressed by a transfer passage from the last molding cavity into the lost cavity and remains there during the entire injection process. An excess pressure in the lost cavity can occur depending on the level of the evacuation performed before the injection.

It is preferably also possible that one or several injection nozzles are provided which are preferably arranged adjacent to one another, whereof each injection nozzle fills a number of molding cavities arranged in series successively with the thermosetting injection-molding compound, and with the transfer passage between two adjacent molding cavities, depending on the geometry of the finished products, having a width in a range of between approximately 0.5 mm to 5 mm, preferably a width of 0.5 mm to 2 mm, a depth of a few hundredths of millimeters and a length of a few hundredths of millimeters, and the last mold cavity being connected to a so-called lost cavity. The mold cavities which define the contour of the finished products are formed by two mold plates which are movable relative to one another.

It is an important aspect of embodiments of the invention that, as mentioned hereinabove, the transfer passages between the mold cavities have the smallest possible cross section. It is ensured thereby that one mold cavity after the other is filled fully until finally a low quantity of material enters the lost cavity after filling the last mold cavity. The air present in the mold cavities prior to the start of the injection process will be pressed into the lost cavity.

BRIEF DESCRIPTION OF THE DRAWINGS

Embodiments of the invention will be explained below in closer detail by reference to the enclosed drawings, in which.

DETAILED DESCRIPTION OF EMBODIMENTS

Figure 1:
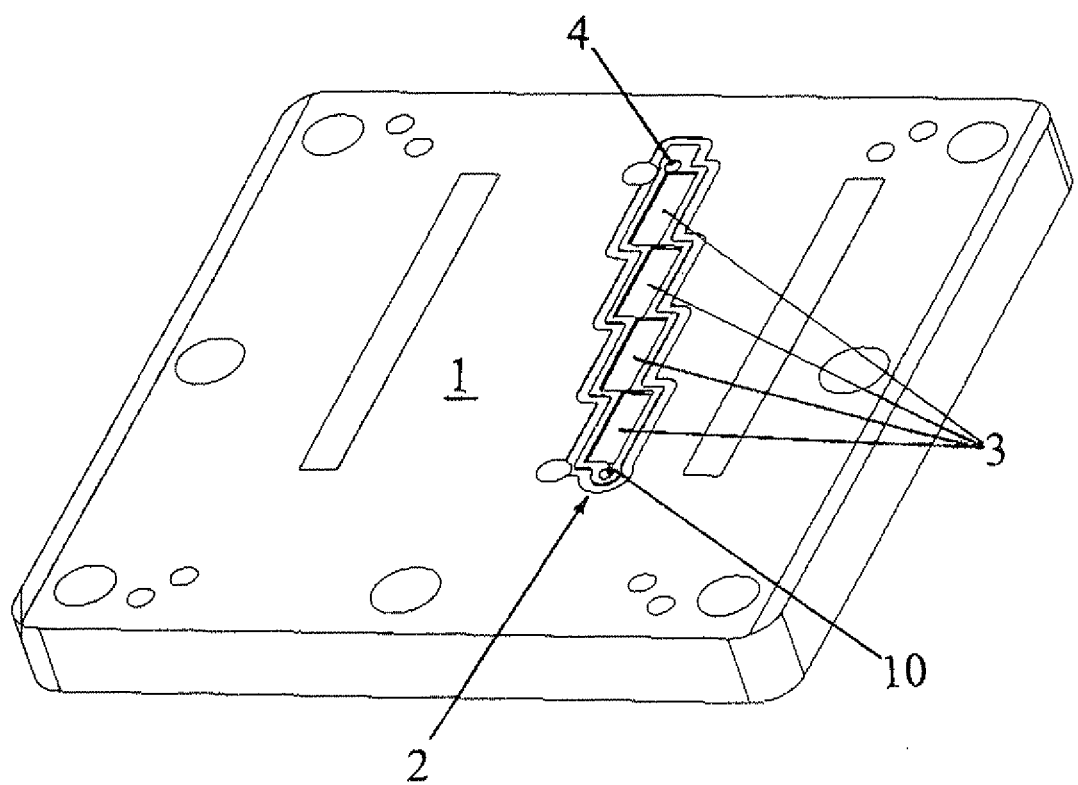
FIG. 1 illustrates an oblique view of a molding plate in an opened state in accordance with the invention.

Reference is made in the drawings to molding plates for the production of platelets. It is understood however that other injection-molded parts which can be produced in this manner will fall under embodiments of the invention. The transfer passage geometry is dependent on the geometry of the molded parts to be produced.

As illustrated in FIG. 1, the molding plate 1 includes at least one, preferably a plurality of seats for injection nozzles 2 on a bottom side thereof, with several successively arranged molding cavities 3 for the injection-molded parts being associated with each injection nozzle 2. Depending on the geometry of the injection-molded parts and the molding plate 1, more or less molding cavities 3 can be supplied via an injection nozzle 2.

It is provided in FIG. 1 by way of example that only a number of molding cavities 3 are filled with injection-molding compound by an injection nozzle 2 which rests thereon in a respective nozzle seat. The molding plate 1 as illustrated in FIG. 1, therefore, allows the simultaneous production of four platelets via one injection nozzle 2 in a single work step. At the end of each row of molding cavities 3 there is a passage to a lost cavity 4. It is understood that it is also possible to provide several seats for injection nozzles 2, which can be respectively associated to a number of molding cavities 3 arranged in series.

Depending on the geometry of the product to be produced, the number of the injection nozzles 2 can vary over a wide range and the injection nozzles 2 can be spatially arranged in a random fashion. Similarly, the number of molding cavities 3 which are supplied via an injection nozzle 2 with the injection-molded compound can also vary.

Figure 2:
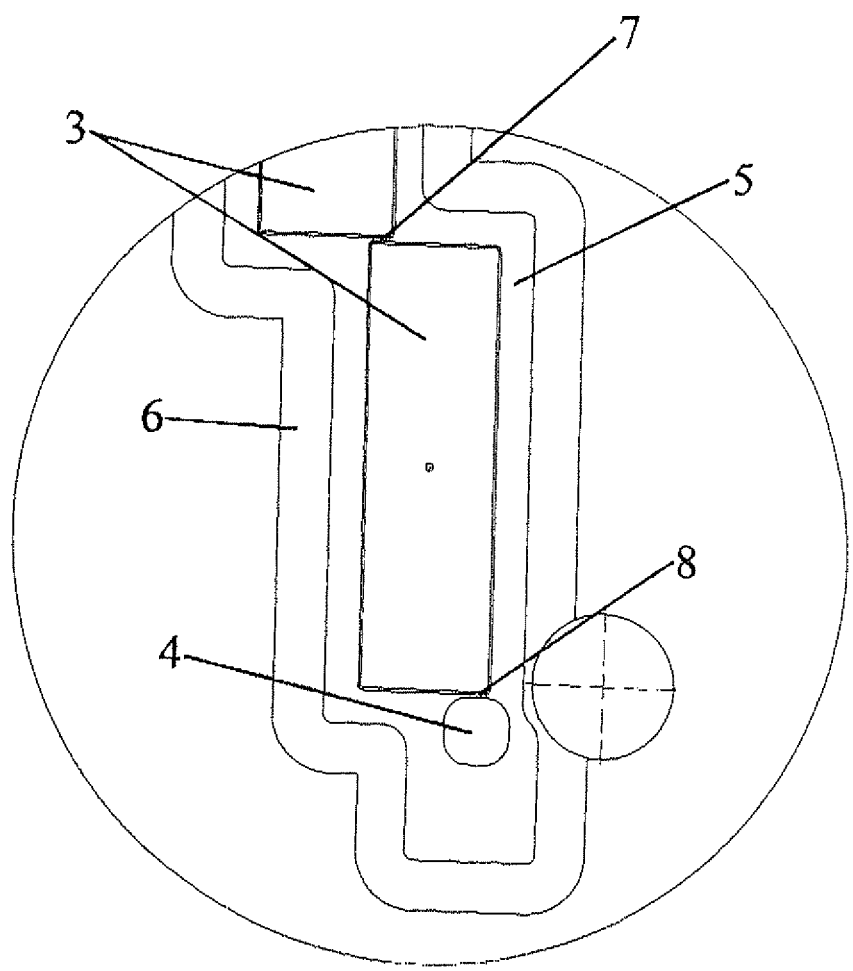
FIG. 2 illustrates a detailed top, sectional view of the molding plate of FIG. 1.

As illustrated in the detailed sectional view of FIG. 2, the transfer passage 7 between adjacent molding cavities 3 and the transfer passage 8 to the lost cavity 4 are illustrated in an enlarged scale. In a preferred embodiment of the invention, the contact surfaces 5 of two molding plates are enclosed by exposed areas 6, from which a part of the molding plate material is removed by milling or die-sinking electrical discharge machining, or in any other suitable manner. This leads to an increase in the distance/tightness of the two contact surfaces 5 between the molding plates 1 when the molding plates are pressed together. The transfer passages 7, 8 are dimensioned in such a way that under the predetermined injection-molding conditions the reliable filling of all successively arranged molding cavities and at least a partial filling of the lost cavity 4 is ensured and the products will sever from one another in the known manner during movement of the two molding plates away from one another and during the detachment of the injection-molded parts and do not contain any sprues that are visible with the naked eye.

In the illustrated case of a molding plate 1 for producing platelets made of silicone, the transfer passages 7, 8 have a predetermined width of approximately 1.8 mm for example, a predetermined depth of 0.05 mm and a predetermined length of 0.05 mm. The dimensions of the transfer passages 7, 8 can have a predetermined width in a range of between 0.5 mm to 5 mm, a predetermined depth in a range of between 0.01 mm to 0.1 mm and a predetermined length in a range of between 0.01 mm to 0.1 mm depending on the type of the injection-molding material, the geometry of the product to be produced and the predetermined working conditions of the injection-molding system.

Figure 3:
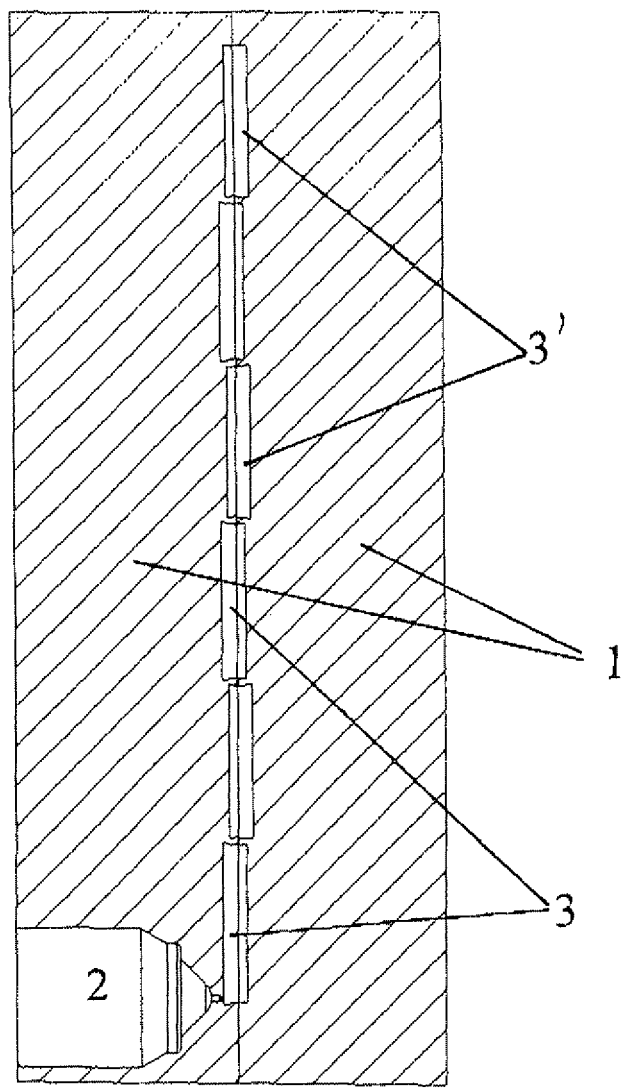
FIG. 3 illustrates a vertical sectional view through two closed molding plates in accordance with FIG. 1 with the tip of the injection nozzle and a row of cavities which are supplied with injection-molding compound via said injection nozzle.

As illustrated in FIG. 3, a further preferred embodiment of the invention includes adjacently disposed molding plates 1 having adjacently disposed molding cavities 3, 3'. The adjacently disposed molding cavities 3, 3' are not divided equally in the two molding plates 1, but rather, are arranged in a slightly perpendicularly offset manner with respect to each other. The first mold cavity 3 is deeper in a first molding plate 1 and the adjacent second mold cavity 3' is situated spatially higher than would correspond to half its volume. In the corresponding molding plate 1 these conditions are reversed. The individual parts will sever from one another once the molding plates 1 are opened and are removed in the known manner from the molding plates 1.

Figure 4:
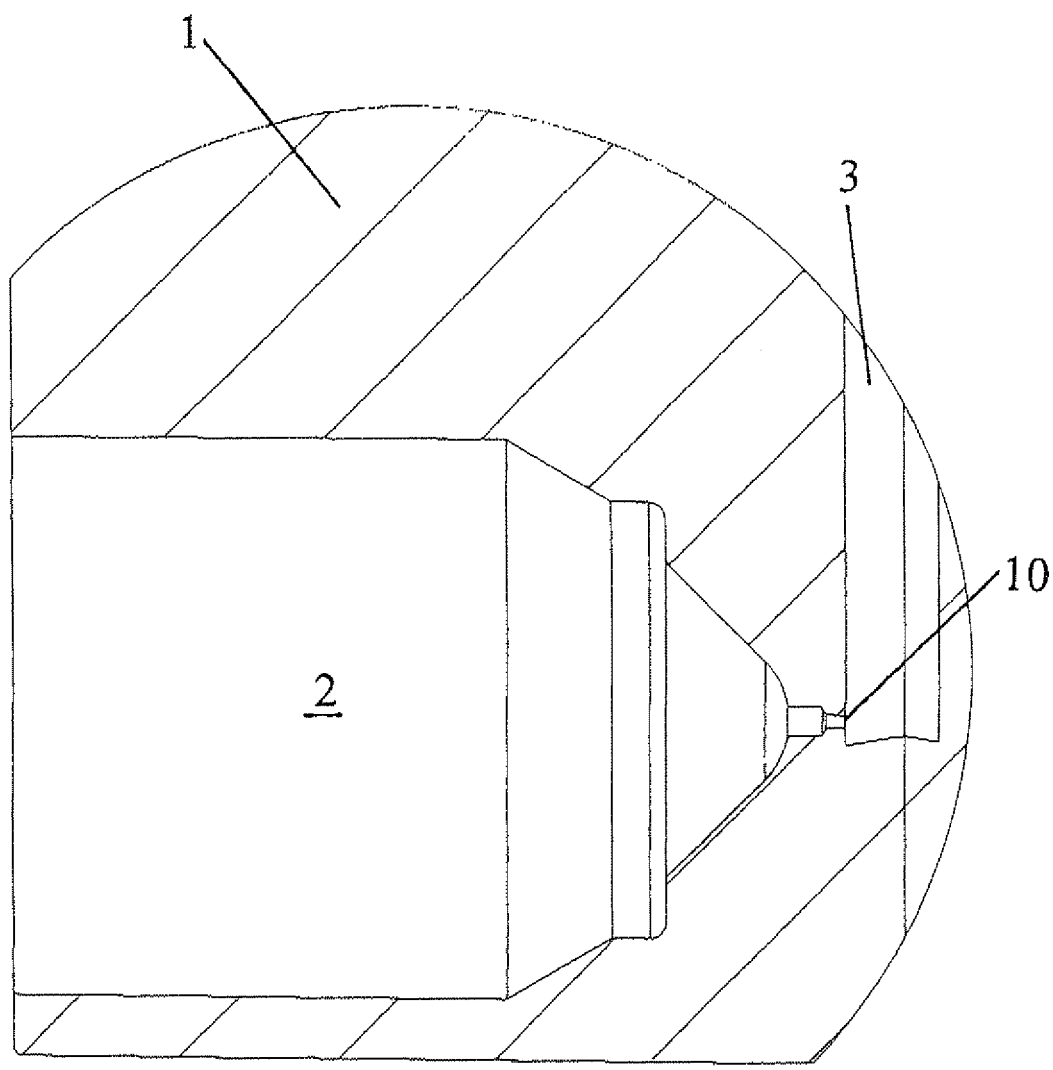
FIG. 4 illustrates an enlarged view of the sectional view in accordance with FIG. 3 in the region of the nozzle tip.

As illustrated in FIG. 4, an enlarged sectional view of the profile through the molding plate of FIG. 3 is provided. The drawing clearly shows a further advantageous embodiment of the apparatus in accordance with the invention, in which the first mold cavity 3 is injected in a sprue-free manner from the side, e.g., via a cold-runner injection-molding nozzle 2 as known from EP 1 477 292 or a similar injection-molding nozzle. It is also possible to centrally inject the first mold cavity 3 in a sprue-free manner.

Figure 5:
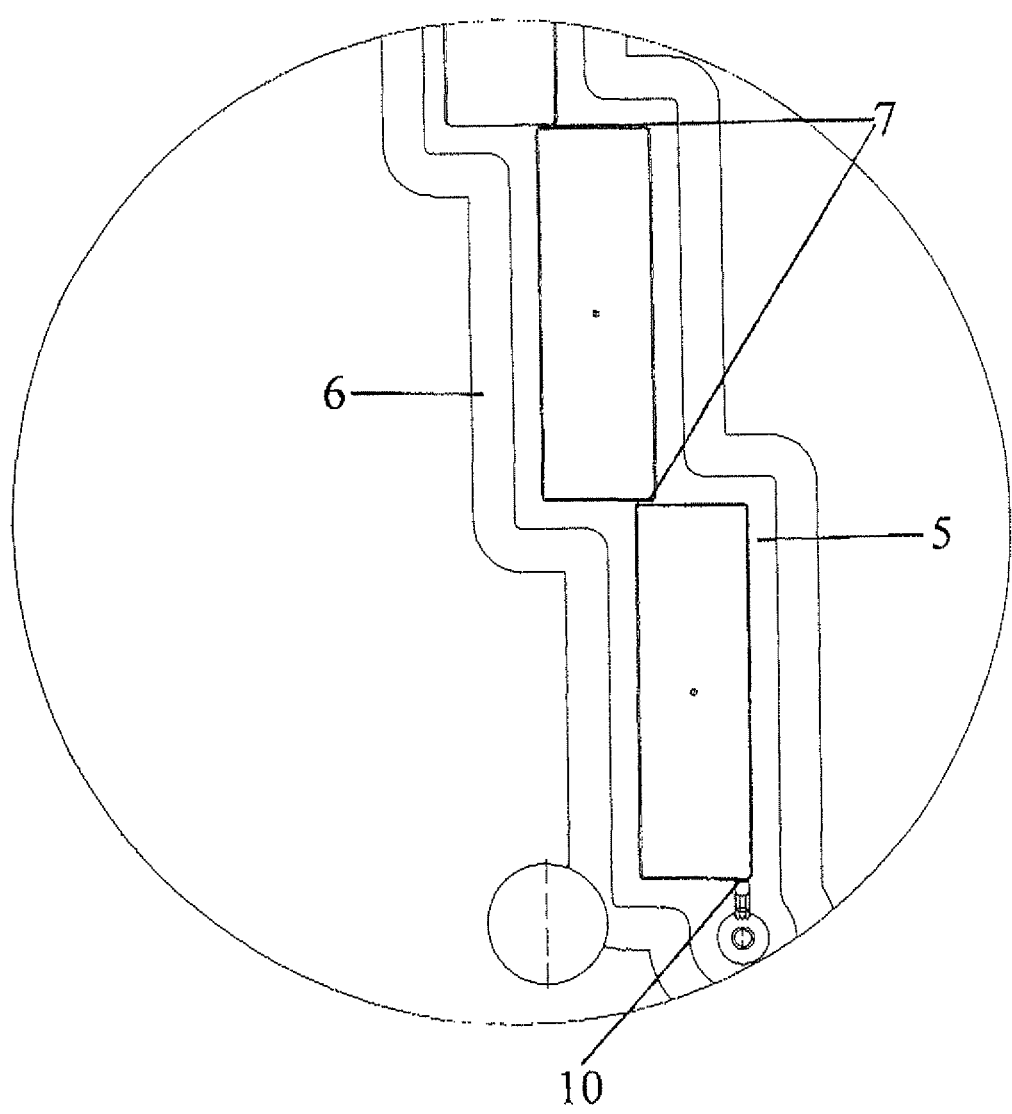
FIG. 5 illustrates a further partial view of the molding plate.

As illustrated in FIG. 5, a further detailed sectional view of the molding plate 1 of FIG. 1 is provided. All molding cavities 3 are successively filled in this case too via the injection point 10, with the transfer passages 7 allowing the passage of the injection-molded compound from one mold cavity 3 to the next adjacent mold cavity 3. It is understood that the lateral offset of the individual molding cavities 3 only represents one possible variant. The contact surface 5 can be enclosed by an exposed area 6 in order to increase the tightness between the contact surfaces 5.

An advantage of embodiments of the invention is that several molding cavities 3 can be filled successively via a single injection nozzle and the individual injection-molded parts can be severed in a virtually sprue-free manner from one another during opening of the molding plates 1. Any residual air that may still be present after the evacuation of the molding cavities will collect in the lost cavity 4, by way of which a constant high quality of the injection-molded parts can be achieved. At the same time, the complexity of the apparatuses will be reduced because the number of injection nozzles can be reduced substantially in combination with a simultaneously increased number of producible injection-molded parts per working step.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for producing several injection-molded parts, the method comprising:
    closing a mold comprising at least two corresponding molding plates which form several mold cavities defining a contour of finished products and a lost cavity; and
    injecting a material via at least one injection nozzle comprising a cold runner nozzle into a mold cavity such that the material flows successively through nozzle-like transfer passages between the mold cavities from one mold cavity to an adjacent mold cavity and then terminating into the lost cavity,
    wherein the lost cavity is configured accommodate excess material and air, wherein individual mold cavities are arranged in series in a laterally offset manner with respect to each other.

2. The method of claim 1, wherein the injection occurs via several injection nozzles into several mold cavities, which are respectively fluidically connected to additional mold cavities connected by transfer passages.

3. The method of claim 1, wherein a first mold cavity is injected centrally in a sprue-free manner via the at least one injection nozzle.

4. The method of claim 1, wherein a first mold cavity is injected laterally in a sprue-free manner via the at least one injection nozzle.

5. The method of claim 1, wherein the material comprises a fluid plastic configured to solidify at a high temperatures.

6. The method of claim 1, wherein the material comprises a vulcanizing elastomeric material.

7. An apparatus for producing several injection-molded parts, the apparatus comprising:
    a mold that includes at least two corresponding molding plates which can be moved between an opened position and a closed position and which form several mold cavities;
    at least one injection nozzle configured to introduce a material into a mold cavity;
    a plurality of first transfer passages configured to fluidically connect the mold cavities to each when the molding plates are in the closed position; and
    a lost cavity configured for fluidic connection to a last mold cavity via a second transfer passage,
    wherein individual mold cavities are arranged in series in a laterally offset manner with respect to each other.

8. The apparatus of claim 7, wherein the lost cavity is sealed in an air-tight manner apart from the second transfer passage when the molding plates are in the closed position.

9. The apparatus of claim 7, wherein one of the first transfer passages between adjacent mold cavities and another of the first transfer passages from the last mold cavity to the lost cavity has a cross section which approximately corresponds to that of the injection nozzle.

10. The apparatus of claim 9, wherein one of the first transfer passages between adjacent mold cavities and another one of the first transfer passages from the last mold cavity to the lost cavity have:
    a predetermined width in a range of between 0.9 mm to 1.7 mm;
    a predetermined depth in a range of between 0.06 mm to 0.02 mm; and
    a predetermined length in a range of between 0.06 mm to 0.02 mm.

11. The apparatus of claim 10, wherein the predetermined width, depth and range are dependent upon the geometry of the injection-molded parts, the type of the used injection-molding compound and the predetermined injection-molding conditions.

12. The apparatus of claim 7, wherein the injection nozzle is centrally directed into a mold cavity.

13. The apparatus of claim 7, wherein the injection nozzle is laterally directed into a mold cavity.

14. The apparatus of claim 7, wherein contact surfaces of adjacent molding plates are enclosed by exposed areas, from which a portion of a molding plate material has been slightly removed.

15. The apparatus of claim 7, wherein the mold cavities are formed by recesses in the molding plates which are arranged in a differently deep way for adjacent mold cavities.

16. The apparatus of claim 7, wherein several injection nozzles are provided which open into several mold cavities, to which a number of further mold cavities are linked which are connected by transfer passages.

17. A method for simultaneously producing several injection-molded parts, the method comprising:

providing a mold according to claim 7, comprising a plurality of molding plates fluidically connected to each other and which combine form a plurality of mold cavities defining a contour of a finished injection-molded product; and injecting a material via the injection nozzle into one of the mold cavities such that the material flows successively through the mold cavities from one mold cavity to an adjacent mold cavity.

18. The method of claim 17, wherein the material comprises a fluid plastic configured to solidify at a high temperatures.

19. The method of claim 17, wherein the material comprises a vulcanizing elastomeric material.

* * * * *